US012803203B2

(12) United States Patent
Wang et al.

(10) Patent No.: US 12,803,203 B2
(45) Date of Patent: Nov. 17, 2026

(54) TERMINAL HAVING MEMORY RING

(71) Applicant: Changchun Jetty Automotive Technology Co., Ltd., Changchun (CN)

(72) Inventors: Chao Wang, Changchun (CN); Haibo Bi, Changchun (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 372 days.

(21) Appl. No.: 18/579,654

(22) PCT Filed: Jul. 15, 2022

(86) PCT No.: PCT/CN2022/106048

§ 371 (c)(1),
(2) Date: Jan. 16, 2024

(87) PCT Pub. No.: WO2023/284868

PCT Pub. Date: Jan. 19, 2023

(65) Prior Publication Data

US 2024/0332843 A1 Oct. 3, 2024

(30) Foreign Application Priority Data

Jul. 15, 2021 (CN) ......................... 202110801855.4
Jul. 15, 2021 (CN) ......................... 202121611259.1

(51) Int. Cl.

| | |
|---|---|
| ***H01R 13/03*** | (2006.01) |
| ***H01R 13/11*** | (2006.01) |
| ***H01R 13/66*** | (2006.01) |

(52) U.S. Cl.
CPC ........... *H01R 13/03* (2013.01); *H01R 13/111* (2013.01); *H01R 13/6683* (2013.01)

(58) Field of Classification Search
CPC .... H01R 13/5808; H01R 13/03; H01R 13/111
(Continued)

(56) References Cited

U.S. PATENT DOCUMENTS 4,497,527 A * 2/1985 Cameron ................. H01R 4/01 439/161
4,634,201 A 1/1987 Kemka
(Continued)

FOREIGN PATENT DOCUMENTS

CN 1671329 A 9/2005
CN 203895350 U 10/2014
(Continued)

OTHER PUBLICATIONS

First Office Action issued for corresponding Japanese Patent Application No. 2024-501758 mailed on Jan. 28, 2025 10 pages.
(Continued)

*Primary Examiner* — Hae Moon Hyeon
(74) *Attorney, Agent, or Firm* — LOZA & LOZA, LLP; Michael Fedrick

(57) ABSTRACT

A terminal having a memory ring, including a terminal body and a memory ring. The terminal body includes a contact section. The memory ring is sleeved on an outer side of the contact section, and is in contact with the contact section, The memory ring is made of a memory alloy and is capable of causing the contact section to contract.

20 Claims, 4 Drawing Sheets

(58) Field of Classification Search
USPC .................................. 439/161, 887, 349, 556
See application file for complete search history.

(56) References Cited

U.S. PATENT DOCUMENTS

| | | | | |
|---|---|---|---|---|
| 5,211,183 A | 5/1993 | Wilson | | |
| 6,716,071 B2 * | 4/2004 | Miyazaki | H01R 13/748 | 439/421 |
| 7,201,613 B2 * | 4/2007 | Sasaki | H01R 13/2421 | 439/700 |
| 7,207,816 B1 * | 4/2007 | Friske | H01R 4/01 | 439/161 |
| 8,648,507 B2 * | 2/2014 | Chamberlin | H02K 5/225 | 439/813 |
| 8,808,038 B2 * | 8/2014 | Hwang | G01R 1/06722 | 439/700 |
| 2014/0024270 A1 * | 1/2014 | Jee | F16L 21/08 | 439/887 |
| 2016/0156126 A1 * | 6/2016 | Eliassen | H01R 43/26 | 439/784 |
| 2017/0244196 A1 † | 8/2017 | Ilie | | |
| 2020/0136288 A1 † | 4/2020 | Ilie | | |

FOREIGN PATENT DOCUMENTS

| | | | | |
|---|---|---|---|---|
| CN | 205104702 U | 3/2016 | | |
| CN | 205231299 U | 5/2016 | | |
| CN | 212991379 U | 4/2021 | | |
| CN | 113410683 A | 9/2021 | | |
| CN | 215834753 U | 2/2022 | | |
| DE | 202016102043 U1 | 5/2016 | | |
| GB | 1395601 A | 5/1975 | | |
| GB | 1504704 A | 3/1978 | | |
| JP | S58157981 U | 10/1983 | | |
| JP | 62190610 A | 8/1987 | | |
| JP | 4298975 A | 10/1992 | | |
| JP | 2010008314 A | 1/2010 | | |
| JP | 57054909 B2 | 7/2015 | | |
| JP | 2018156896 A | 10/2018 | | |
| JP | 2020537078 A | 12/2020 | | |
| KR | 101873212 B1 | 7/2018 | | |
| WO | WO-2015014812 A1 * | 2/2015 | | H01R 13/11 |
| WO | 2015130011 A1 | 9/2015 | | |

OTHER PUBLICATIONS

International Search Report issued for counterpart International Patent Application No. PCT/CN2022/106048 dated Sep. 27, 2022, 2 pgs.

First Office Action issued on Nov. 16, 2021 for counterpart Chinese Patent Application No. 202121611259.1 with machine EN translation, 2 pgs.

First Office Action issued on Aug. 4, 2025 for counterpart European patent application No. 22841501.4.

Decision of Rejection issued on Aug. 12, 2025 for counterpart Chinese patent application No. 202110801855.4.

Extended European Search Report issued on Nov. 14, 2024 for counterpart European Patent Application No. 22841501.4, 11 pgs.

Office Action issued on Apr. 15, 2025 for counterpart Chinese Patent Application No. 202110801855.4.

Search report issued on Apr. 15, 2025 for counterpart Chinese Patent Application No. 202110801855.4.

Office Action issued on Jun. 10, 2025 for corresponding Japanese Patent Application 2024-501758.

Examination Report issued on Jan. 5, 2026 for counterpart Indian Patent Application No. 202427009951.

Office Action and Search Report issued on Feb. 11, 2026 for counterpart Brazilian Patent Application No. BR 11 2024 000651 4.

* cited by examiner
† cited by third party

TERMINAL HAVING MEMORY RING

CROSS REFERENCE TO RELATED APPLICATIONS

The present disclosure is the U.S. national stage of International Patent Application No. PCT/CN2022/106048 filed on Jul. 15, 2022, which claims priority to Chinese Invention patent application No. 202110801855.4 filed on Jul. 15, 2021 and Chinese Utility Model patent application No. 202121611259.1 filed on Jul. 15, 2021, which are hereby incorporated by reference in their entireties.

TECHNICAL FIELD

The present disclosure relates to a terminal having a memory ring.

BACKGROUND

With the gradual popularization of electric vehicles, the market demands for charging plugs and charging sockets are also increasing. In the prior art, terminals on a charging plug, a charging pile, a charging socket and an automobile are all in contact with mating terminals by means of elastic pieces, bolt tightening, mechanical structures, etc., and the mounting requires an insertion force and a tool. In addition, the resistance of the terminal increases and the current thereof decreases due to the increase of the temperature during working.

SUMMARY

In order to improve the terminal butting efficiency, the present disclosure provides a terminal having a memory ring, which can realize a butting without an insertion force, and ensure, through a temperature rise during working, a contact area and a contact force between a terminal and a mating terminal, and improve contact reliability. Since the insertion force is not required, the work is easier and the working efficiency is improved.

The present disclosure adopts the following technical solutions to solve its technical problem.

A terminal having a memory ring, including a terminal body and a memory ring. The terminal body includes a contact section, and a plugging cavity with a variable radial size is provided in the contact section. The memory ring is sleeved on an outer side of the contact section and is in contact with the contact section. The memory ring is made of a memory alloy.

The present disclosure has the following advantageous effects:

1. A butting without an insertion force can be realized, and a contact area and a contact force between a terminal and a mating terminal are ensured by a temperature rise during working, thereby improving contact reliability. Since the insertion force is not required, the work is easier and the working efficiency is improved.
2. When the terminal is working, the temperature of the terminal gradually increases, and when the temperature is greater than a transformation temperature, the memory ring contracts, so that the contact area between the terminal and the mating terminal increases and the resistance decreases, thereby preventing the further reduction of current flowing through the terminal and the mating terminal.

BRIEF DESCRIPTION OF DRAWINGS

The drawings illustrated here are intended to provide a further understanding of the present disclosure, and constitute a part of the present disclosure rather than limitations thereto. In the drawings.

DESCRIPTION OF EMBODIMENTS

Figure 1:
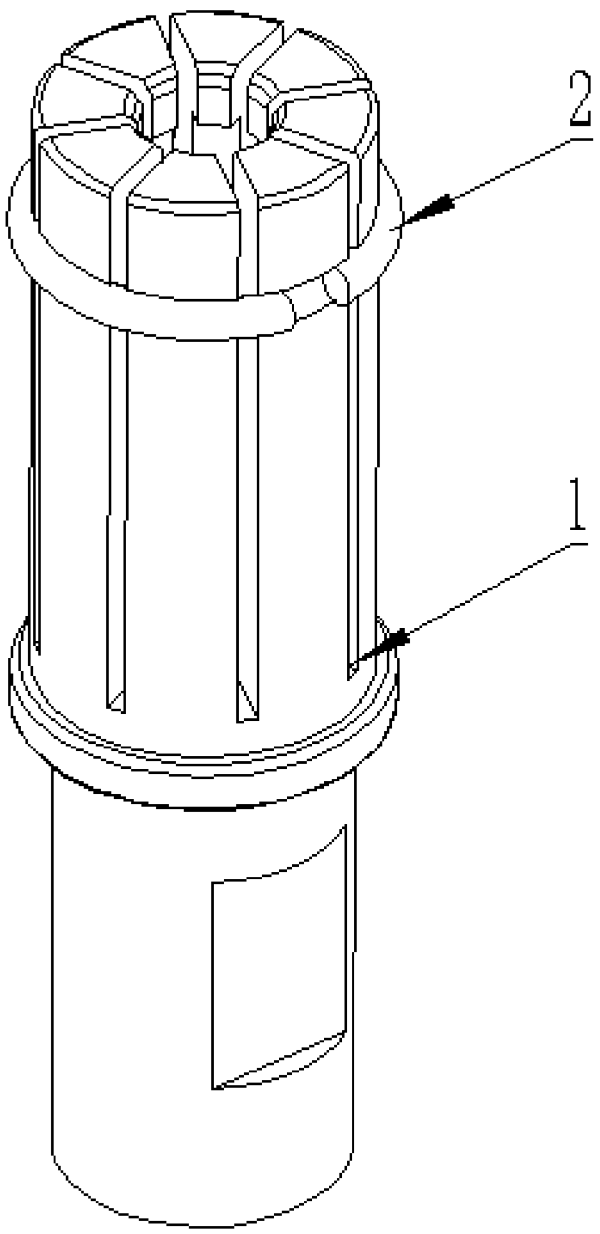
FIG. 1 illustrates a schematic diagram of a terminal having a memory ring in an expanded state.
Figure 2:
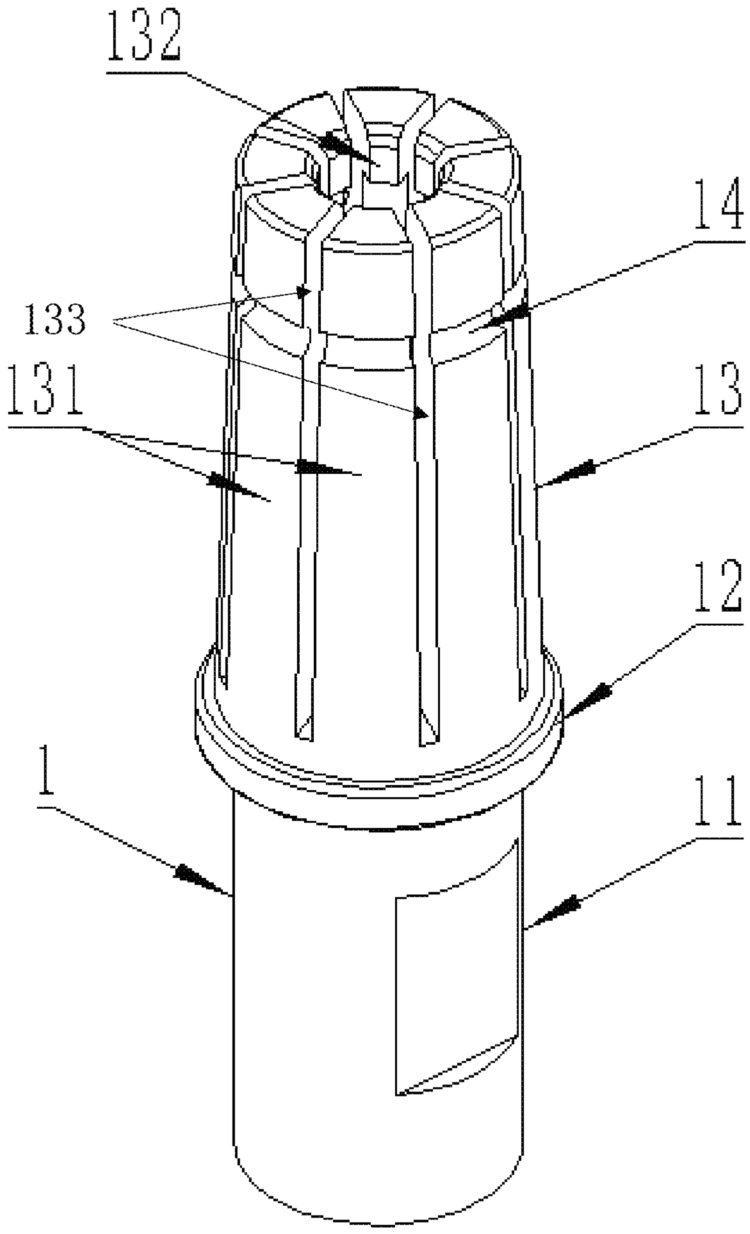
FIG. 2 illustrates a schematic diagram of a terminal body.

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure.

Embodiments of the present disclosure provide a terminal having a memory ring, including a terminal body 1 and a memory ring 2. The terminal body 1 includes a contact section 13, and a plugging cavity 132 with a variable radial size is provided in the contact section 13. The memory ring 2 is sleeved on an outer side of the contact section 13, and is in contact with the contact section 13. The memory ring 2 is made of a memory alloy and is capable of causing the contact section 13 to contract, as illustrated in FIGS. 1 to 4.

The memory ring 2 has a transformation temperature. The contact section 13 is normally in a radially expanded state. When the temperature of the memory ring 2 is lower than the transformation temperature, the memory ring 2 expands in a radial direction, so that the contact section 13 expands in the radial direction synchronously. When the temperature of the memory ring 2 is higher than the transformation temperature, the memory ring 2 contracts in the radial direction, so that the contact section 13 contract in the radial direction synchronously. Thus, through the temperature rise, a contact area and a contact force between the terminal and the mating terminal are ensured and a contact reliability is improved. In addition, since the insertion force is not required, the work is easier and the working efficiency is improved.

The memory ring 2 is made of a memory alloy. Specifically, the memory ring 2 may be made of a memory alloy with a transformation temperature of 40° C. to 70° C., that is, the memory ring 2 has a transformation temperature of 40° C. to 70° C.

The memory alloy refers to a special metal material which can undergo plastic deformation in a certain temperature range and then restore its original macroscopic shape in another temperature range. In the present disclosure, the temperature point, at which the plastic deformation occurs, is called as a transformation temperature. The transformation temperature of the memory alloy can be changed by changing the content of different metals in the memory alloy. Generally, the transformation temperature is selected to between 40° C. and 70° C. If the transformation temperature is lower than 40° C., the ambient temperature of the terminal will be close to 40° C. even without a current conduction, resulting in the memory ring 2 being in a contracted state, an aperture of the terminal being smaller, and the mating terminal not being able to be inserted into the plugging cavity in the contact section 13, such that an electric device cannot be inserted for working.

At room temperature, the mating terminal 3 and the terminal with the memory ring, after being plugged with each other, start to conduct current. Since the memory ring 2 is in an expanded state at the beginning of plugging, the contact area between the terminal with the contracted memory ring and the mating terminal is small and the current is large, which leads to a temperature rise of the terminals that are plugged with each other. If the transformation temperature is higher than 70° C., the time of the temperature rise of the terminals will be long, and the electric device will be in a high current state for a long time, which may easily lead to electrical aging, and in serious cases, the electric device may be overloaded and damaged, resulting in unnecessary losses.

Therefore, the transformation temperature of the terminal with the contractible memory ring is generally set to be between 40° C. and 70° C.

In this embodiment, the contact section 13 is provided with at least two grooves 133 extending in an axial direction, and the grooves divide the contact section into at least two contact elastic pieces. The contact section 13 includes a plurality of contact elastic pieces 131, which are arranged at intervals in a circumferential direction of the contact section 13.

In some embodiments, an inscribed cross-section of an inner surface of the plugging cavity is in a shape of circular, elliptical, polygonal, flat, E-shaped, F-shaped, H-shaped, K-shaped, L-shaped, T-shaped, U-shaped, V-shaped, W-shaped, X-shaped, Y-shaped, Z-shaped, semi-arc-shaped, arc-shaped or wave-shaped. The shape of the inscribed cross-section of the inner surface of the plugging cavity is designed into various shapes, which is convenient for a designer to select different shapes of plugging terminals according to the actual layout environment thereof, reduce the volume of the plugging structure, optimize the contact area and enhance the electrical performance of the plugging terminals.

An outer surface of the contact section 13 is provided with at least one mounting annular groove 14, and the at least one of the memory rings 2 is respectively matchably sleeved on the at least one mounting annular groove 14. A cross-section of the mounting annular groove 14 may be circular or polygonal, rectangular, rhombic, triangular, fan-shaped or trapezoidal.

Figure 5:
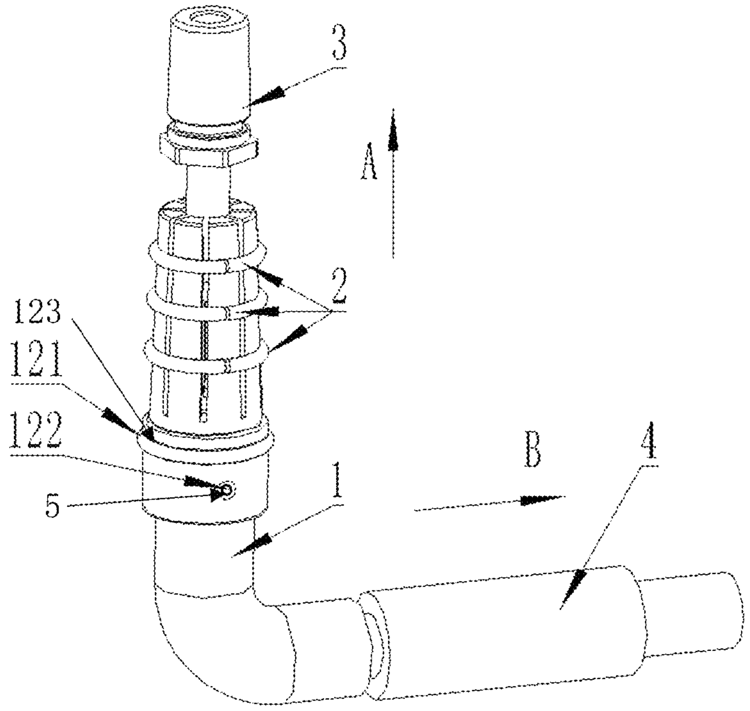
FIG. 5 illustrates a schematic diagram in which an included angle between a plugging direction of a contact section and a wiring direction of a cable connection section is 90°.

In this embodiment, one end of the contact section 13 is connected to an end of the transition section 12. A plurality of memory rings 2, for example three memory rings 2, are sleeved on the outer side of the contact section 13, and are sequentially arranged in a direction from the one end to the other end of the contact section 13, as illustrated in FIG. 5.

In this embodiment, in the direction from the one end to the other end of the contact section 13, the cross-sectional areas of the plurality of the memory rings 2 may increase in sequence or decrease in sequence. In the direction from the one end to the other end of the contact section 13, the distances between any two adjacent memory rings 2 may increase in sequence or decrease in sequence.

Figure 3:
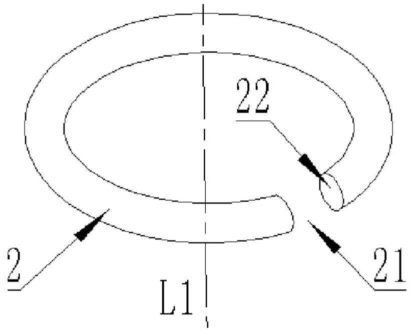
FIG. 3 illustrates a schematic diagram of a memory ring.

In this embodiment, the memory ring 2 is an opening ring structure, which refers to a structure capable of forming a line segment when being stretched. The memory ring 2 is clamped with the contact section 13. The memory ring 2 has an opening 21. An end face 22 of the memory ring 2 at the opening 21 are disposed in parallel or obliquely with respect to an axis L1 of the memory ring 2. The opening 21 has a length greater than or equal to 1 mm, and the length of the opening 21 is less than half of a circumference of the memory ring 2, as illustrated in FIG. 3.

The memory ring 2 is an opening ring structure, which begins to contract when the temperatures of the terminal and the memory ring 2 are greater than the transformation temperature. If the end faces 22 of the memory ring 2 at the opening 21 are opposite to each other and a length of the opening 21 is less than a contracting distance of the memory ring 2, the end faces 22 of the memory ring 2 at the opening 21 will be abutted against each other to prevent the memory ring 2 from further contracting, such that the contact elastic pieces cannot be contracted, resulting in an insufficient gripping force between the terminal having the memory ring and the mating terminal and an increase of a contact resistance between the terminals, which will reduce the service life of the electric device, and in serious cases, lead to accidents such as the electrical device being burned out. If the length of the opening 21 is more than half of the circumference of the memory ring 2, the memory ring 2 itself cannot form a major ring structure and cannot be mounted on the outer side of the contact section 13, and then cannot achieve the function of contracting the plugging cavity.

Figure 6:
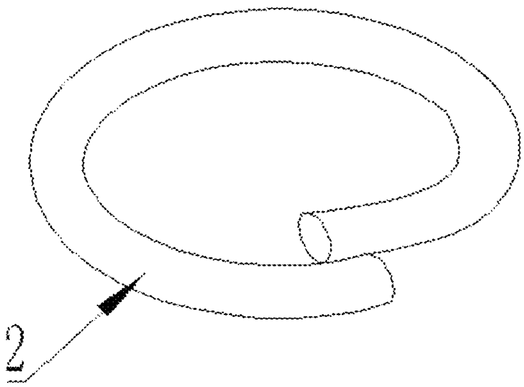
FIG. 6 illustrates a schematic diagram in which two ends of a memory ring overlap with each other at an opening.

In some embodiments, the two ends of the memory ring form a spiral overlapping area, and the length of the spiral overlapping area is less than half of the circumference of the memory ring. When the temperature of the memory ring 2 is greater than the transformation temperature, the memory ring 2 contracts. Since the memory ring 2 has the overlapping area as illustrated in FIG. 6, the memory ring 2 can contract even if there is no opening. If the length of the spiral overlapping area is greater than half of the circumference of the memory ring, after the memory ring 2 contracts, an excess portion of the spiral overlapping area protrudes to the outside of the mounting annular groove, and will interfere with a contracted part of the memory ring 2, which will affect the contraction of the memory ring 2 to the plugging cavity, resulting in an insufficient gripping force between the terminal having the memory ring and the mating terminal, and an increase of the contact resistance between the terminals.

In some embodiments, the end face 22 of the memory ring 2 is a flat surface, an inclined surface, a cambered surface, a spherical surface, or a wavy surface. In order to avoid an interference between the end face 22 of the memory ring 2 and an assembly position of the electric device during a terminal assembly, the end face 22 of the memory ring 2 may be set as a flat surface, an inclined surface, a cambered surface, a spherical surface, or a wavy surface as required to meet the requirements of different mounting environments.

In this embodiment, the memory ring 2 and the contact section 13 may be in direct or clearance contact, and exemplarily, the memory ring 2 and the contact section 13 are in direct contact. The cross-section of the memory ring 2 may be in a shape of circular, elliptical, rectangular, rhombic, triangular, polygonal, fan-shaped, or trapezoidal.

A cross-sectional size of the memory ring 2 may be obtained as required and through a limited number of experiments. Exemplarily, the cross-sectional size of the memory ring 2 is 0.2 to 2.1 times of a wall thickness of the contact elastic piece 131.

The contraction forces of the memory rings 2 with different cross-sectional sizes are explained through the following experiment.

In this experiment, the experimental material is a group of memory rings 2 with cross-sectional sizes that are different times of the wall thickness of the contact shrapnel 131. The memory rings 2 are made of the same nickel-titanium alloy with a transformation temperature of 40° C. The number of the memory rings 2 is 13, and the experiment adopts a precision dynamometer. When the temperature of the memory ring 2 is greater than the transformation temperature and the ambient temperature reaches 50° C., the contraction force of each memory ring 2 is measured and a value is read on the precision dynamometer. The contraction forces of the memory ring 2 greater than 30 N are ideal values.

TABLE 1

Different Contraction Forces of Memory Ring 2 With Different Cross-Sectional Sizes

| Multiple of the cross-sectional size of the memory ring relative to the wall thickness of the contact elastic piece | | | | | | | | | | | | |
|---|---|---|---|---|---|---|---|---|---|---|---|---|
| 0.01 | 0.05 | 0.1 | 0.2 | 0.3 | 0.6 | 0.9 | 1.2 | 1.5 | 1.8 | 2.1 | 2.4 | 2.7 |
| Contraction force of the memory ring (N) | | | | | | | | | | | | |
| 0.5 | 9 | 20 | 33 | 43 | 55 | 67 | 72 | 80 | 91 | 106 | 109 | 110 |

As can be seen from Table 1, when the cross-sectional size of the memory ring 2 is 0.2 to 2.1 times of the wall thickness of the contact elastic piece, the measured contraction force meets the requirement of the ideal value; when the cross-sectional size of the memory ring is less than 0.2 times of the wall thickness of the contact elastic piece, the generated contraction force is not enough to tighten the contact elastic piece 131, and the mating terminal will fall off; and when the cross-sectional size of the memory ring is more than 2.1 times of the wall thickness of the contact elastic piece, the generated contraction force is not increased obviously along with the increase of the cross-sectional size of the memory ring, which causes the waste of the memory alloy material. Therefore, the inventor adopts a preferable solution in which the cross-sectional size of the memory ring 2 is 0.2 to 2.1 times of the wall thickness of the contact elastic piece 131.

In this embodiment, the terminal body 1 further includes a cable connection section 11 and a transition section 12, and the cable connection section 11, the transition section 12 and the contact section 13 are disposed in sequence. The transition section 12 is a connection transition area between the cable connection section 11 and the contact section 13, and is also an area where the terminal body 1 is assembled and fixed with the electric device. The cable connection section 11 can be electrically connected to the cable 4, so that electric energy can be transmitted through the plugging of the terminal body 1 with the mating terminal.

The cable connection section 11 has a flat plate structure, a U-shaped structure, a major arc structure, a barrel structure, a cylindrical structure, a bowl structure or a polygonal structure. The cable connection section 11 is electrically connected to the cable by a crimping or welding process. The cable connection section 11 is designed into various structures, so that different structures may be selected depending on the electrical connection requirements and the assembly environment of the electric device, and a stable electrical connection between the cable connection section 11 and the cable can be established. Generally, the U-shaped structure, the major arc structure, the barrel structure or the polygonal structure is suitable for crimping and welding, and the flat plate structure or the bowl structure is suitable for welding.

The cable connection section 11 is connected to the conductor of the cable by one or more selected from crimping, friction welding, ultrasonic welding, arc welding, laser welding, and resistance welding.

The crimping is to apply a pressure to deform the cable connection section 1 and part of wires inside it together by means of mechanical deformation, so that the wires are in full contact with the interior of the cable connection section 1 and connected thereto by friction. The welding includes ultrasonic welding, resistance welding, arc welding, pressure welding, electromagnetic welding, laser welding, etc. The cable connection section 1 and part of the wires are welded together to achieve stable electrical and mechanical performances.

The ultrasonic welding is to transmit high-frequency vibration waves to the surfaces of two objects to be welded, so that the surfaces of the two objects rub against each other under pressure to form a fuse molecular layer.

The resistance welding refers to a method of welding by passing strong current through a contact point between an electrode and a workpiece to generate heat by a contact resistance.

The arc welding is to convert electric energy into heat energy and mechanical energy needed for welding by using electric arc as a heat source and the physical phenomenon of air discharge, so as to connect metals. The arc welding mainly includes shielded metal arc welding, submerged arc welding and gas shielded welding, etc.

The pressure welding is a method of applying a pressure to welding parts to make joint surfaces closely contact and produce certain plastic deformation to complete the welding.

The electromagnetic welding method is to use an electromagnetic induction coil to generate short but very strong current from a pulse generator, and an electromagnetic field generated by the induction coil can instantly collide and squeeze the materials to be welded together.

The laser welding is an efficient and precise welding method using a laser beam of a high energy density as a heat source.

As needed, the transition section 12 may be externally provided with a sealing-ring mounting groove 123 in which a sealing ring 121 is sleeved. The sealing ring is made of rubber, which is well deformable and waterproof, and can be directly compressed outside the transition section 12 together with the mating terminal to form a sealing structure, thereby effectively preventing external water from entering the terminal, ensuring the safety of electrical connection, and prolonging the service life of the terminal.

The transition section is provided with a sensor mounting hole 122 in which a temperature sensor 5 is assembled.

The temperature sensor may be mounted in the sensor mounting hole 122 at any part of the terminal, and may be mounted in directions X, Y and Z.

This solution allows the temperature measurement accuracy to be close or equal to a theoretical absolute value, thereby achieving an extremely high detection accuracy and a rapid output capability.

The temperature sensor is partially or wholly disposed in the sensor mounting hole 122.

The temperature sensor is in interference fit with the sensor mounting hole 122.

An outer wall of the temperature sensor is provided with external threads, the sensor mounting hole 122 is provided with internal threads, and the temperature sensor is in threaded connection with the sensor mounting hole 122. The temperature sensor may be connected to a transmission cable after being mounted.

The temperature sensor is externally provided with a shielding layer, which can prevent data of the temperature sensor from an external interference and ensure the accuracy of the data.

The temperature sensor is an NTC (Negative Temperature Coefficient) temperature sensor or a PTC (Positive Temperature Coefficient) temperature sensor. The two temperature sensors are advantageous in that they are small in volume and can measure a gap that cannot be measured by other thermometers; they are convenient to use and the resistance value can be arbitrarily selected between 0.1 and 100 k≤Ω; they are easy to be processed into complex shapes and can be mass-produced; and owing to the good stability and the strong overload capacity, they are suitable for products such as adapters which require a small volume and a stable performance.

The sensor mounting hole 122 is disposed on the transition section 12.

In some embodiments, there is provided a temperature acquisition device, an output module of which includes a programmable controller, a transmission unit and a power supply. The temperature sensor is electrically connected to the programmable controller, and the transmission unit is configured to wirelessly or wiredly transmit temperature information obtained by the programmable controller.

Further, in some embodiments, there is provided a temperature acquisition system, in which an acquisition terminal is configured to obtain temperature information through an information receiving device, a storage unit is configured to store the temperature information, and an comparison unit is configured to compare the temperature information with preset safety information; if the acquired information exceeds the preset information, the acquisition terminal sends an alarm through an alarm unit to inform the staff. A plurality of acquisition terminals are remotely connected to a server, which monitors all the acquired temperature information and may transmit the temperature information to a mobile terminal, so that the staff can master the temperature information of each terminal in a work area anytime and anywhere.

Figure 4:
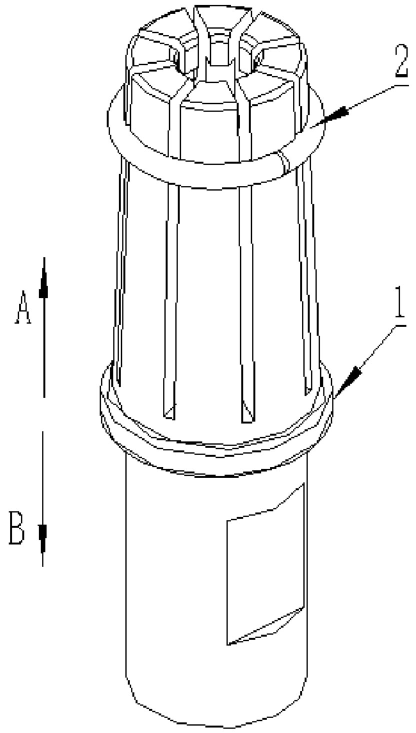
FIG. 4 illustrates a schematic diagram of a terminal having a memory ring in a contracted state.

In this embodiment, an included angle between a plugging direction A of the contact section 13 and a wiring direction B of the cable connection section 11 may be greater than 0° and less than or equal to 180°, as illustrated in FIGS. 4 and 5. That is, the included angle between the contact section 13 and the cable connection section 11 may be various to meet the assembly requirements in different scenarios. Multiple cables may be connected to the terminals in many different directions depending on the actual situation. The inventor fully considers this point and selects a solution in which the angle is greater than 0° and less than or equal to 180° to meet the actual needs, which is convenient for a designer to select different outlet directions according to the actual layout environment of a terminal with memory function, thereby reducing the volume of electric device, optimizing the contact area between the terminal and the wire, and enhancing the electrical performance of the terminal having the memory ring.

The memory ring 2 is made of a memory alloy, which is an intelligent metal with a memory, and its microstructure has two relatively stable states. The memory alloy may be changed into any desired shape at a high temperature and may be stretched at a low temperature. When being reheated, the alloy will remember its original shape and change back. The memory alloy has different crystal structures at temperatures above and below its transformation temperature, and when the temperature changes around the transformation temperature, the memory alloy will contract or expand, thereby causing a change of its morphology. According to this characteristic, the memory ring 2 in the present disclosure is made of a memory metal with a transformation temperature of 40° C. to 70° C., and is manufactured into a required size in a temperature higher than the transformation temperature.

In some embodiments, the memory alloy is specifically a nickel-titanium alloy, which is a binary alloy composed of nickel and titanium. The nickel-titanium alloy has two different crystal structure phases, i.e., an austenite phase and a martensite phase, due to the changes of the temperature and the mechanical pressure. The memory ring 2 with a transformation temperature of 40° C. to 70° C. can be obtained through the nickel-titanium alloy with different metal contents.

The contact elastic piece 131 has a plating layer thereon, so as to improve the corrosion resistance of the terminal, improve the conductivity, increase the plugging times, thereby better prolonging the service life of the terminal.

The plating layer may be formed by electroplating, chemical plating, magnetron sputtering, vacuum plating or the like.

The electroplating is a process of plating, on a surface of some metal, a thin layer of other metal or alloy by using electrolysis principle.

The chemical plating is a deposition process that produces a metal through a controllable oxidation-reduction reaction under a metal catalytic action.

The magnetron sputtering is to use an interaction of a magnetic field and an electric field to make electrons move spirally near a target surface, thereby increasing the probability that electrons bombard argon to generate ions. The generated ions bombard the target surface under the action of the electric field so as to sputter a target material.

The vacuum plating is to deposit various metal and non-metal films on the surface of plastic parts by means of distillation or sputtering under a vacuum condition.

The plating layer is made of one or more selected from the group consisting of gold, silver, nickel, tin, zinc, tin-lead alloy, silver-antimony alloy, palladium, palladium-nickel alloy, graphite silver, graphene silver and silver-gold-zirconium alloy. As an active metal, copper will react with oxygen and water during use, so one or more inactive metals are needed as the material of the plating layer to prolong the service life of the terminal. In addition, for a metal contact to be plugged and unplugged frequently, a metal with good wear resistance is needed to serve as the plating layer, thereby greatly prolonging the service life of the contact. Moreover, some contacts require good conductivity, and the above metals have better conductivity and stability than copper or copper alloy, so that the terminal can obtain a better electrical performance and a longer service life.

In order to demonstrate the influences of different materials of the plating layer on the overall performance of the terminal, the inventor adopts the plugging terminal samples and the matched plugging pieces to carry out a series of tests on the number of times of plugging and unplugging and the corrosion resistance time. The plugging terminal samples have the same specification and the same material, and have the plating layers of different materials. The matched plugging pieces have the same specification. In order to prove the advantages and disadvantages of the selected materials and other conventional plating materials, the inventor also adopts tin, nickel and zinc as the materials of the plating layer for experiment. The experimental results are shown in Table 2 below.

The number of times of plugging and unplugging in Table 2 are obtained as follows: the terminal having a memory ring and the mating terminal are fixed on an experimental platform: a mechanical device is used to simulate the plugging and unplugging of the mating terminal: after every 100 times of plugging and unplugging, it is necessary to stop and observe the damage of the plating layer on the surface of the terminal. When the plating layer on the surface of the terminal is scratched and the material of the terminal itself is exposed, the experiment is stopped, and then the number of times of plugging and unplugging at that time is recorded. In this embodiment, if the number of times of plugging and unplugging is less than 8000, it is considered as unqualified.

The test on the corrosion resistance time in Table 2 is to put terminal into a salt spray test chamber, spray salt fog for each position on the terminal take out and clean the terminal every 20 hours to observe the corrosion condition of the surface, which is a cycle. When a corrosion area of the surface of the terminal is more than 10% of a total area thereof, the test is stopped, and then the number of cycles at that time is recorded. In this embodiment, if the number of cycles is less than 80, it is considered as unqualified.

The plating layer includes a bottom layer and a surface layer.

In some embodiments, the plating layer is formed using a multi-layer plating method. After the terminal is processed, there are still many cracks and holes under the surface micro-interface. These cracks and holes are the main reasons for the wear and corrosion of the terminal during use. Therefore, it is desirable to plate a bottom layer on the surface of the contact section 13 to fill the cracks and holes on the surface, so that the surface of the contact elastic piece 131 is smooth and free of defects, and then a surface layer is plated, so that the combination is firmer and smoother and the surface of the plating layer has no cracks or holes. As a result, the wear resistance, the corrosion resistance and the electrical performance of the terminal are better, and the service life of the terminal is greatly prolonged.

The bottom layer is made of one or more selected from the group consisting of gold, silver, nickel, tin, tin-lead alloy and zinc. The surface layer is made of one or more selected from the group consisting of gold, silver, silver-antimony alloy, palladium, palladium-nickel alloy, graphite silver, graphene silver and silver-gold-zirconium alloy.

In some embodiments, the bottom layer has a thickness of 0.01 μm to 15 μm, and exemplarily a thickness of 0.1 μm to 9 μm.

In some embodiments, the surface layer has a thickness of 0.5 μm to 55 μm, and exemplarily a thickness of 1 μm to 35 μm.

In order to demonstrate the influence of the change of the thickness of the bottom layer of the plating layer on the overall performance of the terminal, the inventor adopts the terminal samples and the matched plugging pieces to carry out a series of tests on the temperature rise and the corrosion resistance time. The terminal samples have the same specification and the same material, and have the nickel-plated bottom layers of different thicknesses and the silver-plated surface layers of the same thickness. The matched plugging pieces have the same specification. The experimental results are shown in Table 3 below.

TABLE 2

Influences of Different Materials of Plating Layer on the Number of Times of Plugging and Unplugging and Corrosion Resistance of Terminal

| Different Materials of Plating Layer | | | | | | | | | | | |
|---|---|---|---|---|---|---|---|---|---|---|---|
| Gold | Silver | Silver-antimony alloy | Graphite silver | Graphene silver | Silver-gold-zirconium alloy | Tin | Nickel | Palladium | Palladium-nickel alloy | Tin-lead alloy | Zinc |
| Number of Times of Plugging and Unplugging | | | | | | | | | | | |
| 12100 | 11100 | 11200 | 12500 | 12700 | 13000 | 8100 | 8300 | 11000 | 12100 | 9800 | 8500 |
| Number of Cycles of Corrosion Resistance Tests | | | | | | | | | | | |
| 131 | 121 | 120 | 130 | 127 | 132 | 84 | 86 | 110 | 11 | 112 | 85 |

As can be seen from Table 2, when the material of the plating layer is selected from gold, silver, silver-antimony alloy, palladium, palladium-nickel alloy, graphite silver, graphene silver or silver-gold-zirconium alloy, the experimental result largely exceeds the standard value and the performance is stable. When the material of the plating layer is selected from nickel, tin, tin-lead alloy or zinc, the experimental result can also meet the requirement. Thus, the inventor adopts the material of the plating layer selected from one or more of gold, silver, nickel, tin, tin-lead alloy, zinc, silver-antimony alloy, palladium, palladium-nickel alloy, graphite silver, graphene silver and silver-gold-zirconium alloy.

The test on the temperature rise in Table 3 is to supply the same power to the terminals and the mating terminals 30 that have been plugged with the terminals, detect the temperatures of the same position of the terminals before the power supply and after the temperature is stable in a closed environment, and take a difference therebetween to obtain an absolute value. In this embodiment, if the temperature rise is greater than 50K, it is considered as unqualified.

The test on the corrosion resistance time in Table 3 is to put the terminal into a salt spray test chamber, spray salt fog for each position on the terminal, take out and clean the terminal every 20 hours to observe the surface corrosion, which is a cycle. When a corrosion area of the surface of the terminal is more than 10% of a total area thereof, the test is stopped and then the number of cycles at that time is recorded. In this embodiment, if the number of cycles is less than 80, it is considered as unqualified.

TABLE 3

Influences of Different Thicknesses of bottom layer of plating layer on Temperature Rise and Corrosion Resistance of Terminal

| Different Nickel-Plated Thicknesses of Bottom Layer (μm) | 0.001 | 0.005 | 0.01 | 0.05 | 0.1 | 0.5 | 1 | 3 | 5 | 6 | 9 | 11 | 13 | 15 | 17 | 19 |
|---|---|---|---|---|---|---|---|---|---|---|---|---|---|---|---|---|
| Temperature Rise of Plugging Piece (k) | 10.7 | 12.5 | 14.9 | 16.6 | 18.2 | 21.7 | 24.5 | 26.7 | 28.6 | 31.3 | 35.9 | 40.3 | 43.5 | 47.9 | 58.1 | 67.4 |
| Number of Cycles of Corrosion Resistance Tests | 67 | 79 | 82 | 96 | 105 | 109 | 115 | 117 | 120 | 124 | 128 | 1128 | 130 | 130 | 129 | 127 |

As can be seen from Table 3, when the thickness of the nickel-plated bottom layer is less than 0.01 μm, although the temperature rise of the terminal is qualified, the number of cycles of corrosion resistance tests of the terminal is less than 80 since the bottom layer of the plating layer is thin, and the performance requirement of the terminal cannot be met, which greatly affects the overall performance and the service life of the plugging Piece, and causes the product life to be reduced sharply or even failure burning accidents in serious cases. When the thickness of the nickel-plated bottom layer is greater than 15 μm, the heat generated by the terminal cannot be radiated since the bottom layer of the plating layer is thick, which makes the temperature rise of the terminal unqualified, and the thick plating layer is easy to fall off the surface of the terminal, resulting in a decrease in the number of cycles of corrosion resistance tests. Thus, the inventor selects the thickness of the bottom layer of the plating layer to be 0.01 μm to 15 μm. Exemplarily, the inventors finds that the comprehensive effect of the temperature rise and the corrosion resistance of the terminal is better when the thickness of the bottom layer of the plating layer is 0.1 μm to 9 μm. Therefore, in order to further improve the safety, reliability and practicability of the product itself, it is preferable that the thickness of the bottom layer of the plating layer is 0.1 μm to 9 μm.

Similarly, in order to demonstrate the influence of the change of the thickness of the surface layer of the plating layer on the overall performance of the terminal, the inventor adopts the terminal samples and the matched plugging pieces to carry out a series of tests on the temperature rise and the corrosion resistance time. The terminal samples have the same specification and the same material, and have the nickel-plated bottom layers of the same thickness and the silver-plated surface layers of different thicknesses. The matched plugging pieces have the same specification. The experimental results are shown in Table 4 below. The experimental method is the same as that described above.

As can be seen from Table 4, when the thickness of the silver-plated surface layer is less than 0.5 μm, although the temperature rise of the terminal is qualified, the number of cycles of corrosion resistance tests of the terminal is less than 80 since the surface layer of the plating layer is thin, and the performance requirement of the terminal cannot be met, which greatly affects the overall performance and the service life of the plugging piece, and causes the product life to be reduced sharply or even failure burning accidents in serious cases. When the thickness of the silver-plated surface layer is greater than 55 μm, the heat generated by the terminal cannot be radiated since the bottom layer of the plating layer is thick, which makes the temperature rise of the terminal unqualified, and the thick plating layer is easy to fall off the surface of the terminal, resulting in a decrease in the number of cycles of corrosion resistance tests. Moreover, since the surface layer of the plating layer is made of noble metal, the thick plating layer does not improve the performance, and there is no use value. Thus, the inventor selects the thickness of the silver-plated surface layer to be 0.1 μm to 55 μm. Exemplarily, the inventors finds that the comprehensive effect of the temperature rise and the corrosion resistance of the terminal is better when the thickness of the surface layer of the plating layer is 1 μm to 35 μm. Therefore, in order to further improve the safety, reliability and practicability of the product itself, it is preferable that the thickness of the surface layer of the plating layer is 1μ m to 35μ m.

Those described above are merely specific embodiments of the present disclosure, rather than limitations thereto. Various modifications and variations can be made to the present disclosure by persons skilled in the art. Any modification, equivalent substitution, improvement, etc. made within the spirit and principle of the present disclosure should fall within the scope of the claims of the present disclosure.

TABLE 4

Influences of Different Thicknesses of Surface Layer of Plating Layer on Temperature Rise and Corrosion Resistance

| Different Silver-Plated Thicknesses of Surface Layer (μm) | 0.1 | 0.5 | 1 | 1.5 | 5 | 10 | 15 | 20 | 25 | 30 | 35 | 40 | 45 | 50 | 55 | 60 | 65 |
|---|---|---|---|---|---|---|---|---|---|---|---|---|---|---|---|---|---|
| Temperature Rise of Plugging Piece (k) | 11.4 | 13.6 | 15.3 | 17.4 | 21.6 | 23.9 | 25.3 | 28.6 | 31.6 | 35.4 | 38.9 | 42.1 | 45.2 | 48.4 | 49.5 | 55 | 69.6 |
| Number of Cycles of Corrosion Resistance Tests | 75 | 81 | 91 | 93 | 95 | 95 | 98 | 102 | 104 | 109 | 113 | 117 | 119 | 122 | 125 | 124 | 121 |

What is claimed is:

1. A terminal having a memory ring, comprising a terminal body and a memory ring, wherein the terminal body comprises a contact section having a plugging cavity with a variable radial size provided therein, a cable connection section, and a transition section externally provided with a sensor mounting hole in which a temperature sensor is assembled, wherein the cable connection section, the transition section, and the contact section are disposed in sequence; and the memory ring is sleeved on an outer side of the contact section and is in contact with the contact section, and the memory ring is made of a memory alloy.

2. The terminal having a memory ring according to claim 1, wherein the memory ring has a transformation temperature;

when a temperature of the terminal having the memory ring is lower than the transformation temperature, both the memory ring and the plugging cavity are in an expanded state; and when the temperature of the terminal having the memory ring is higher than the transformation temperature, both the memory ring and the plugging cavity are in a contracted state.

3. The terminal having a memory ring according to claim 2, wherein the transformation temperature of the memory ring is 40° C. to 70° C.

4. The terminal having a memory ring according to claim 2, wherein the contact section is provided with at least two grooves extending in an axial direction, and the grooves divide the contact section into at least two contact elastic pieces.

5. The terminal having a memory ring according to claim 4, wherein the terminal comprises a plurality of the memory rings, which are sequentially arranged at intervals along a direction from the first end to the second end of the contact section.

6. The terminal having a memory ring according to claim 5, wherein the cross-sectional areas of the plurality of memory rings increases along said direction.

7. The terminal having a memory ring according to claim 2, wherein the terminal comprises a plurality of the memory rings, which are sequentially arranged at intervals along a direction from the first end to the second end of the contact section.

8. The terminal having a memory ring according to claim 7, wherein the cross-sectional areas of the plurality of memory rings increases along said direction.

9. The terminal having a memory ring according to claim 1, wherein the contact section is provided with at least two grooves extending in an axial direction, and the grooves divide the contact section into at least two contact elastic pieces.

10. The terminal having a memory ring according to claim 1, wherein an outer surface of the contact section is provided with at least one mounting annular groove, and the at least one of the memory rings is respectively matchably sleeved on the at least one mounting annular groove.

11. The terminal having a memory ring according to claim 1, wherein the memory ring is an opening ring structure, and a length of an opening of the memory ring is greater than or equal to 1 mm and is less than half of a circumference of the memory ring.

12. The terminal having a memory ring according to claim 1, wherein two ends of the memory ring form a spiral overlapping area, and a length of the spiral overlapping area is less than half of a circumference of the memory ring.

13. The terminal having a memory ring according to claim 1, wherein the cable connection section is secured to a conductor of a cable by one or more selected from the group consisting of crimping, friction welding, ultrasonic welding, arc welding, laser welding and resistance welding.

14. The terminal having a memory ring according to claim 1, wherein the transition section is externally provided with a sealing-ring mounting groove in which a sealing ring is sleeved.

15. The terminal having a memory ring according to claim 1, wherein the temperature sensor is an NTC temperature sensor or a PTC temperature sensor.

16. The terminal having a memory ring according to claim 1, wherein an included angle between a plugging direction of the contact section and a wiring direction of the cable connection section is greater than 0° and less than or equal to 180°.

17. The terminal having a memory ring according to claim 1, wherein the memory alloy is a nickel-titanium alloy.

18. The terminal having a memory ring according to claim 1, wherein the contact elastic piece has a plating layer thereon.

19. The terminal having a memory ring according to claim 1, wherein the terminal comprises a plurality of the memory rings, which are sequentially arranged at intervals along a direction from the first end to the second end of the contact section.

20. The terminal having a memory ring according to claim 19, wherein the cross-sectional areas of the plurality of memory rings increases along said direction.

* * * * *